G. F. & M. JEROME.
Mower.
No. 21,681.  Patented Oct. 5, 1858.
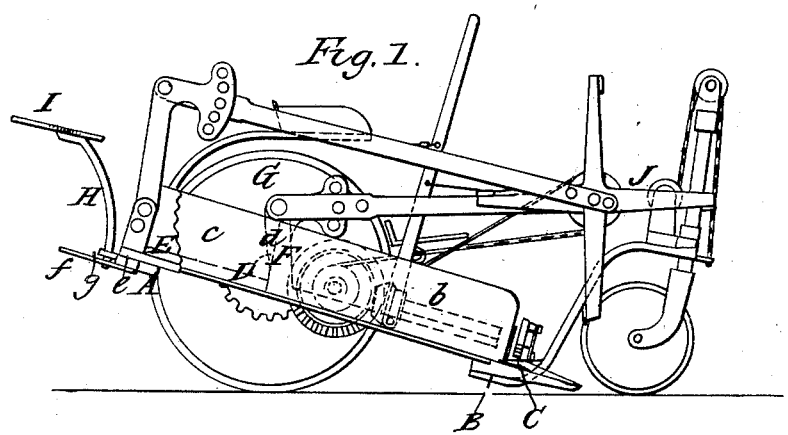
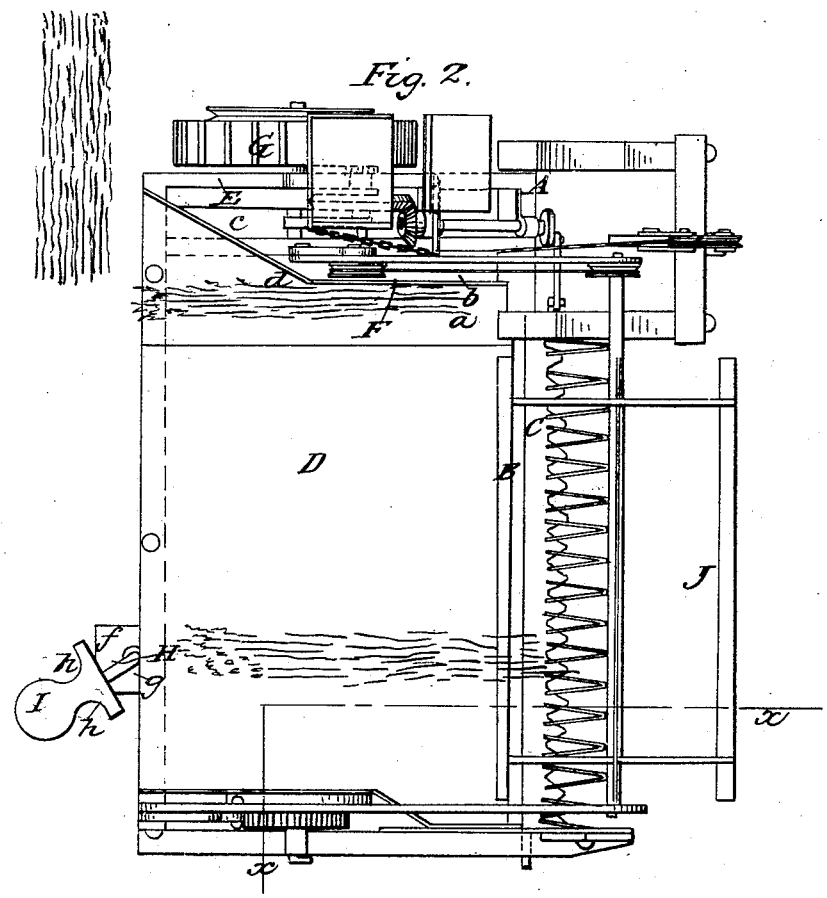

UNITED STATES PATENT OFFICE.

GEO. F. JEROME AND MOSES JEROME, OF MINEOLA, NEW YORK.

IMPROVEMENT IN HARVESTERS.

Specification forming part of Letters Patent No. 21,681, dated October 5, 1858.

*To all whom it may concern:*

Be it known that we, GEORGE F. JEROME and MOSES JEROME, both of Mineola, in the county of Queens and State of New York, have invented a new and Improved Harvesting-Machine; and we do hereby declare that the following is a full, clear, and exact description of the same, reference being had to the annexed drawings, making a part of this specification, in which—

Figure 1 is a vertical section of our invention, taken in the line $x\,x$, Fig. 2. Fig. 2 is a plan or top view of the same.

Similar letters of reference indicate corresponding parts in the two figures.

This invention relates to an improvement in harvesters, whereby the raker may with the greatest facility rake the cut grain from the platform in such a manner that it will fall on the ground nearly in line and back of the driver's seat, at right angles with the path of the movement of the machine, and at a sufficient distance from the standing grain to allow abundant room for a clear unobstructed space for the team on the succeeding round, and at the same time leave the grain so that the butts will be in a right line and in such a state that it may be readily gathered and bound by an attendant.

To enable those skilled in the art to fully understand and construct our invention, we will proceed to describe it.

A represents the main frame of a harvester. B is the finger-bar attached thereto.

C is the sickle, and D is the platform, which rests on a suitable framing, E.

F represents a vertical plate or board, which is attached to the inner side-piece bar, $a$, of the framing E. This plate or board serves as a guard for the gearing in the main frame A. The front part, $b$, of the guard F is parallel with the side pieces of the main frame A; but the back part, $c$, has an oblique position relatively with the front part, $b$, as shown clearly in Fig. 2, the part $c$ extending toward the back part of the driving-wheel G, and forming an obtuse angle, $d$, at its junction with the part $b$.

To the back bar, $e$, of the framing E, and to its under side, a plate, $f$, is firmly attached, said plate projecting outward a suitable distance from the bar $e$, and attached to it at a point nearer to its outer than to its inner end, as shown clearly in Fig. 2.

To the bar $e$, and directly over the plate $f$, a projection, $g$, is attached, said projection being perforated vertically to receive the lower end of a bar, H, which is curved upward and outward to support a raker's seat, I, a sufficient distance back of the platform, the plate $f$ being a foot-piece.

The ordinary reciprocating sickle may be used, and a reel, J, of usual construction, is placed over the fingers and sickle, as usual.

The operation is as follows: As the machine is drawn along the cut grain falls on the platform D, as usual, and the raker, from his seat I, when a sufficient quantity of grain has collected on the platform to form a gavel, pushes the grain, by means of a fork, toward the front part, $b$, of the guard F, and turns the grain on the angle $d$ of the guard, the raker giving a slight twist to the grain, so that it will fall off the platform at right angles to the position in which it fell on the platform. (See red lines, Fig. 2.) In consequence of the oblique position of $c$ relatively with $b$ the grain is readily turned—a very simple manipulation of the fork being required in order to effect the result. The angle $d$ serves as a fulcrum on which the grain is turned, and the impetus given the grain on or against the angle $d$ will insure its complete movement, so that it will be discharged, as described. The bar H of the seat I is allowed to turn freely in its bearing or support $g$, so that the position of the device may readily conform to the movement of the fork and grain, thereby greatly facilitating the manipulation.

We would remark that the seat I is so formed as to have bearings $h\,h$ for the legs of the driver to prevent him being thrown forward in case of the sudden stopping of the machine. The form of the seat is clearly shown in Fig. 2. We would also remark that the grain cannot be raked off obliquely from the platform, or in any way except that herein described, without having the butts lying uneven upon the ground. If raked off obliquely, a portion of the heads will first touch the ground, and the grain will be spread obliquely by the forward movement of the machine; but by raking off the grain at right angles, so that the gavel will drop bodily and at once, the desired object is attained.

Having thus described our invention, what we claim as new, and desire to secure by Letters Patent, is—

The guard F, formed with an oblique back portion, c, in combination with the seat I, placed relatively with respect to each other and the platform D as herein shown and described, and for the purpose set forth.

GEORGE F. JEROME.
MOSES JEROME.

Witnesses:
J. W. COOMBS,
M. HUGHES.